(12) United States Patent
Kobiki et al.

(10) Patent No.: US 9,406,113 B2
(45) Date of Patent: Aug. 2, 2016

(54) IMAGE PROCESSING APPARATUS AND IMAGE DISPLAY APPARATUS

(71) Applicant: KABUSHIKI KAISHA TOSHIBA, Tokyo (JP)

(72) Inventors: Hisashi Kobiki, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 14/141,569

(22) Filed: Dec. 27, 2013

(65) Prior Publication Data

US 2014/0184662 A1 Jul. 3, 2014

(30) Foreign Application Priority Data

Dec. 27, 2012 (JP) ................................ 2012-284867

(51) Int. Cl.
| | |
|---|---|
| *G09G 5/02* | (2006.01) |
| *G06T 5/00* | (2006.01) |
| *G06T 5/40* | (2006.01) |
| *G09G 3/00* | (2006.01) |
| *G09G 3/34* | (2006.01) |

(52) U.S. Cl.
CPC . *G06T 5/009* (2013.01); *G06T 5/40* (2013.01); *G09G 3/002* (2013.01); *G09G 3/3406* (2013.01); *G06T 2207/20008* (2013.01); *G09G 2320/0271* (2013.01); *G09G 2320/0673* (2013.01); *G09G 2340/06* (2013.01); *G09G 2360/144* (2013.01); *G09G 2360/16* (2013.01)

(58) Field of Classification Search
CPC ................... G09G 3/3406; G09G 2320/0271; G09G 2360/16
USPC ................................................... 345/690–694
See application file for complete search history.

(56) References Cited

U.S. PATENT DOCUMENTS

| | | | |
|---|---|---|---|
| 8,089,560 B2 | 1/2012 | Tsutsumi et al. | |
| 2006/0268299 A1* | 11/2006 | Nose .................... | G09G 3/3648 358/1.9 |
| 2009/0009665 A1* | 1/2009 | Tsutsumi ............... | H04N 9/045 348/674 |
| 2012/0026208 A1 | 2/2012 | Kobiki et al. | |

* cited by examiner

*Primary Examiner* — Carolyn R Edwards
(74) *Attorney, Agent, or Firm* — Nixon & Vanderhye, P.C.

(57) ABSTRACT

An image processing apparatus includes a weight calculation unit, a gamma calculation unit, and a conversion unit. The weight calculation unit calculates a weight coefficient to calculate a second gamma characteristic based on light information of an image. The second gamma characteristic has a narrower range of lightness than a first gamma characteristic. The first gamma characteristic represents a characteristic of a display connected to the apparatus in the dark. The gamma calculation unit calculates the second gamma characteristic based on the weight coefficient, and calculates a gamma conversion function based on the second gamma characteristic. The second gamma characteristic more approximates a lightness of the first gamma characteristic if the light information is darker, and more approximates a gradation of the lightness of the first gamma characteristic if the light information is brighter. The conversion unit converts pixel values of the image, based on the gamma conversion function.

8 Claims, 9 Drawing Sheets

IMAGE PROCESSING APPARATUS AND IMAGE DISPLAY APPARATUS

CROSS-REFERENCE TO RELATED APPLICATION

This application is based upon and claims the benefit of priority from Japanese Patent Application No. 2012-284867, filed on Dec. 27, 2012; the entire contents of which are incorporated herein by reference.

FIELD

Embodiments described herein relate generally to an image processing apparatus and an image display apparatus.

BACKGROUND

For example, for the purpose of power saving, technique to reduce a peak luminance of a display device is well known. However, if the peak luminance is reduced, a dynamic range of the display device falls. Because, by reducing the peak luminance, a difference of luminance between dark area and bright area in the image is decreased.

In order to remove this defect, by calculating a gamma signal of entire image and a gamma signal of each local region therein, technique to convert the image using the gamma signals is disclosed. By this technique, even if the peak luminance of entire image is lowly set, the image in which gradation collapse and luminance irregularity of each local region are suppressed can be displayed. On the other hand, in a display device on which bright black phenomenon is increased by external light reflection, in addition to fall of the peak luminance, dynamic range is further fallen by bright black phenomenon of dark part. In this case, even if the conventional technique is applied, fall of contrast of dark part in the image cannot be avoided.

DETAILED DESCRIPTION

According to one embodiment, an image processing apparatus includes a weight calculation unit, a gamma calculation unit, and a conversion unit. The weight calculation unit is configured to calculate a weight coefficient to calculate a second gamma characteristic based on a light information of a target image. The second gamma characteristic has a narrower range of lightness than a first gamma characteristic. The first gamma characteristic represents a characteristic of a display connected to the apparatus in the dark. The gamma calculation unit is configured to calculate the second gamma characteristic based on the weight coefficient, and to calculate a gamma conversion function based on the second gamma characteristic. The second gamma characteristic more approximates a lightness of the first gamma characteristic if the light information is darker, and more approximates a gradation of the lightness of the first gamma characteristic if the light information is brighter. The conversion unit is configured to convert pixel values of the target image, based on the gamma conversion function.

Various embodiments will be described hereinafter with reference to the accompanying drawings.

(The First Embodiment)

Figure 1:
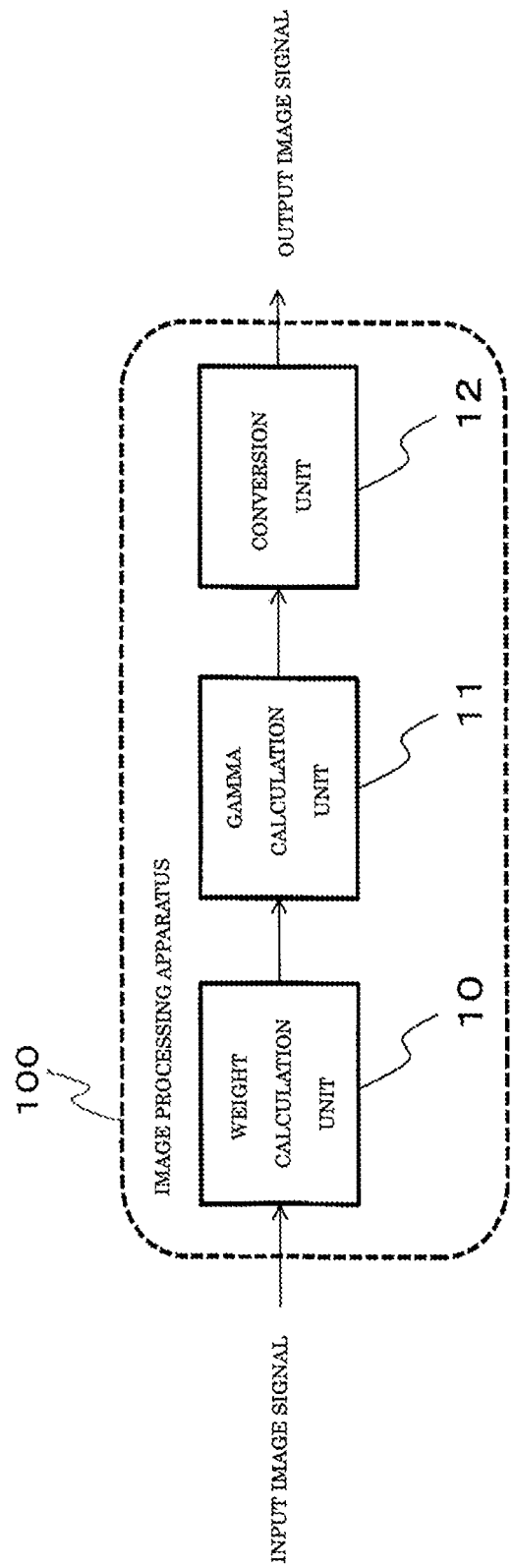
FIG. 1 is a block diagram of an image processing apparatus 100 according to the first embodiment.

FIG. 1 is a block diagram of an image processing apparatus 100 according to the first embodiment. The image processing apparatus 100 includes a weight calculation unit 10, a gamma calculation unit 11, and a conversion unit. In the image processing apparatus 100 of the first embodiment, an input image signal is converted to an output image signal, and outputted. At post stage of the image processing apparatus 100, a display device (not shown in FIG. 19) is connected. The display device displays the output image signal received. The display device may be any of a display and a projector. In case of the display, a CRT display, a liquid crystal display, a plasma display, an organic EL display, or other displays, may be used.

In the first embodiment, an example that a format of the input image signal of a processing target is based on YCbCr transmission standard of International Telecommunication Union will be explained. In the YCbCr transmission standard, each pixel includes three channel signals (luminance component, red-green component, blue-yellow component) as pixel values. In following explanation, among pixel values at a position (u,v) in the image, a luminance component is described as x(u,v). Moreover, format of the input image signal may be represented by another color system except for YCbCr system such as YUV, RGB, HSV. Furthermore, in the first embodiment, a dynamic range of color of each pixel is represented as eight bits (0~255). However, the dynamic range is not limited to eight bits. The input image signal may be an image inputted from all devices or media. For example, the input image signal is inputted from a recording medium such as HDD, an external device connected via a network, or a broadcasting wave such as TV.

The weight calculation unit 10 calculates lightness information of the image. By using the lightness information, the weight calculation unit 10 calculates a weight coefficient λ representing that a second gamma characteristic of the display device (connected to the image processing apparatus 100) is approximated (close) to which of a lightness and a gradient of the lightness of a first gamma characteristic. The first gamma characteristic represents a display characteristic when an image displayed by the display device is viewed in an ideal environment. The ideal environment represents an environment not influenced by external environmental light, such as inside a dark room. The second gamma characteristic represents a display characteristic when an image displayed by the display device is viewed in a viewing environment actually displayed. The viewing environment actually imagined may be a viewing environment displayed by actually observing an external environmental light in real time with an illuminance sensor. Furthermore, it may be a viewing environment previously imagined without the sensor. Based on these viewing environments, the second gamma characteristic is determined. Processing by the weight coefficient λ will be explained afterwards.

The weight calculation unit 10 sends the weight coefficient λ to the gamma calculation unit 11. By using the weight coefficient λ and pixel values of the input image signal, the gamma calculation unit 11 calculates a gamma conversion function to approximate the second gamma characteristic of the display device to any of a lightness and a gradient of the lightness of the first gamma characteristic, and sends this function to the conversion unit 12. The conversion unit 12 converts pixel values of the input image signal by using the gamma conversion function, and obtains an output image signal.

Figure 2:
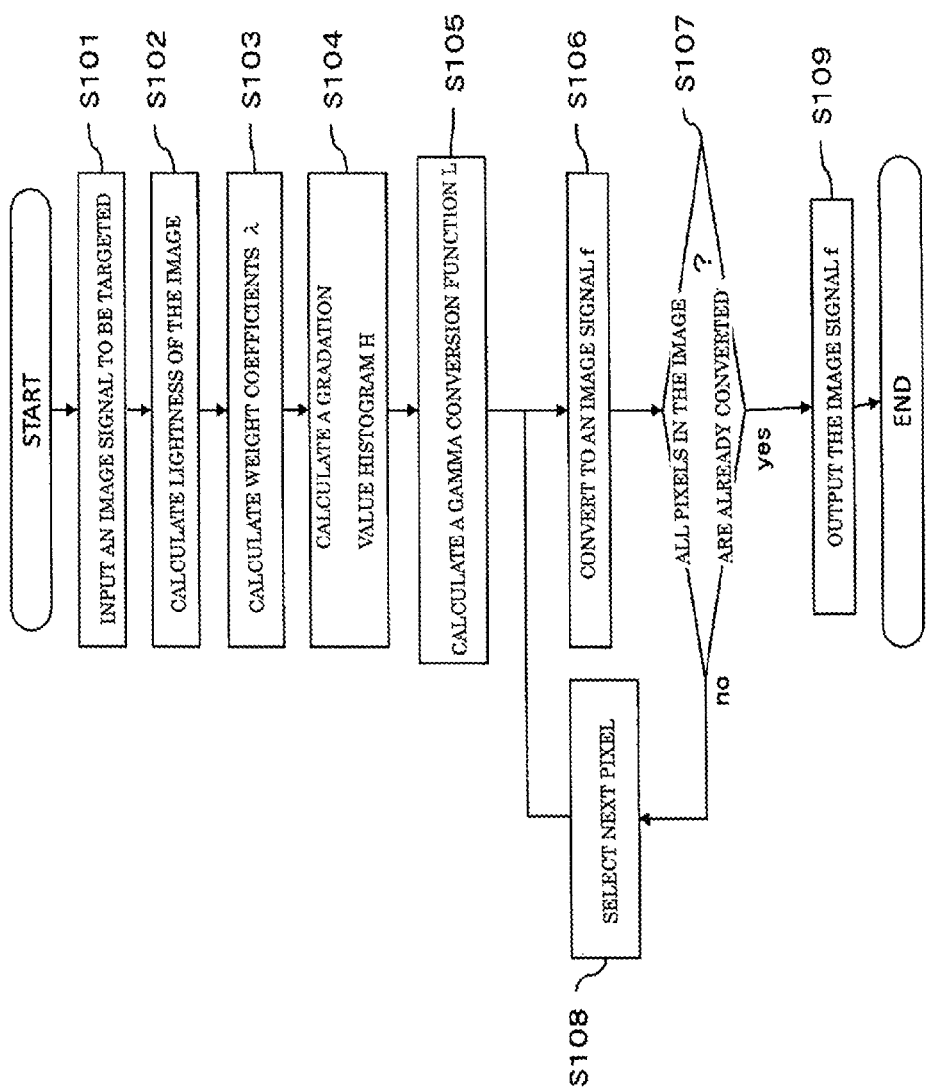
FIG. 2 is a flow chart of operation of the image processing apparatus 100.

Next, operation of each unit will be explained. FIG. 2 is a flow chart of operation of the image display apparatus 100. The weight calculation unit 10 accepts the input image signal (S101), and calculates lightness information of the image (S102). By using the lightness information, the weight calculation unit 10 calculates a weight coefficient λ representing that the second gamma characteristic of the display device (to be connected) is approximated to which of a lightness and a gradient of the lightness of the first gamma characteristic, and sends the weight coefficient λ to the gamma calculation unit 11 (S103).

At S102, the lightness information represents at least one information correlative to a lightness obtained from the input image signal. For example, the lightness information had better be an average, a maximum, a minimum, a median, or a percentile among pixel values of a plurality of pixels included in a region of the image signal. The lightness information may be calculated by another statistical operation. Furthermore, the lightness information may be calculated from not only one image but also a plurality of images temporarily continued such as sequential dynamic image. Furthermore, different lightness information may be calculated from regions separated in space.

At S103, by using the lightness information, a weight coefficient representing that the second gamma coefficient of the display device is approximated to which of a lightness and a gradation of the lightness is calculated.

Figure 3:
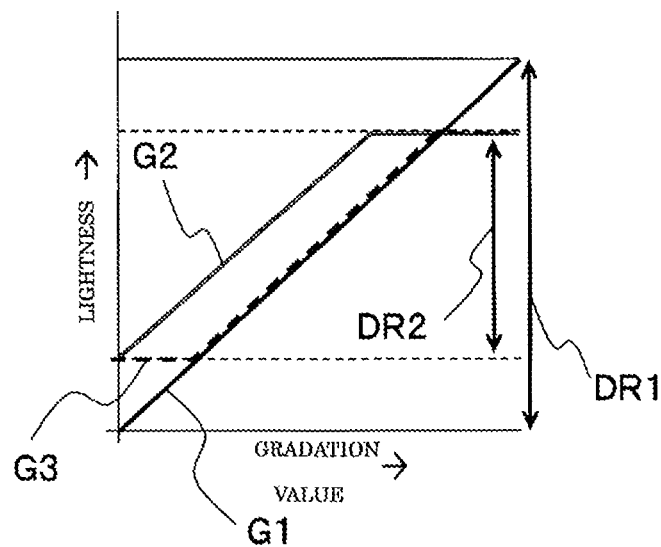
FIG. 3 is a schematic diagram to explain concepts of first and second gamma characteristics.

FIG. 3 is a schematic diagram to show relationship between the first gamma characteristic and the second gamma characteristic of the display device connected. In FIG. 3, G1 is the first gamma characteristic of the display device connected. As to G1, the lightness is continuously changed among all pixel values, and a ratio of the lightness is high, i.e., contrast thereof is high. A range of lightness able to be represented by the display device is DR1.

On the other hand, in a general display device, bright black phenomenon is occurred by reflection of surrounding light, or a peak luminance is lower than an ideal value by characteristic of the display device. As a result, a range of lightness able to be represented is narrower. Here, the peak luminance is a screen luminance of the display to video signal having 100% level. A range of this narrowed lightness is DR2, and a lightness of an image displayed on the display device connected is within DR2.

In this case, G1 (solid line) is the first gamma when the input image signal is displayed as it is on the display device connected. On the other hand, G2 (double line) is the second gamma when the input image signal is displayed on condition that a lightness of the second gamma is approximated to a lightness of the first gamma (emphasis on lightness). Furthermore, G3 (broken line) is the second gamma when the input image signal is displayed on condition that a gradation of lightness of the second gamma is approximated to a gradation of lightness of the first gamma (emphasis on gradation of lightness). Now, quality of low gradation area (dark area of the image) of G2 and G3 are noticed. As to G2 in comparison with G1, an image having high contrast (bright black phenomenon of dark area is reduced) is outputted. As to G3 in comparison with G1, an image having fine tone is outputted.

In the image processing apparatus 100, in order for the gamma calculation unit 11 to calculate a gamma conversion function achieving the second gamma (such as G2 and G3 as mentioned-above), the weight calculation unit 10 calculates a weight coefficient λ by using the lightness information. Specifically, the weight coefficient λ is set so that the darker the lightness information is, the more the lightness is emphasized. Furthermore, the weight coefficient λ is set so that the brighter the lightness information is, the more the gradation of lightness is emphasized. As a result, the image having higher contrast is outputted if the lightness information is darker, and the image having higher tone is outputted if the lightness information is brighter.

As mentioned-above, at S101~S103, the weight coefficient λ is outputted based on lightness information of the input image signal. Accordingly, a control signal to control quality of contrast and tone in the output image can be sent to the gamma calculation unit 11.

The gamma calculation unit 11 calculates a pixel value histogram H from pixel values of pixels included in the image (S104). At S104 in the first embodiment, the histogram H had better be prepared with bins of $x_{max}$ units as maximum pixel values of each pixel.

By using the weight coefficient λ and the histogram H, a gamma conversion function L(x) to approximate the second gamma characteristic of the display device to a lightness and a gradation of the lightness of the first gamma characteristic is calculated, and sent to the conversion unit 12 (S105). The gamma conversion function L(x) is calculated by following equation.

$$L(x) = \operatorname{argmin}(E(x)) \qquad (1)$$

$$E(x) = \lambda \sum_{x=0}^{x_{max}} |R(x) - r(x)| w_\alpha(x) + (1-\lambda) \sum_{x=0}^{x_{max}} \left| \frac{d}{dx} R(x) - \frac{d}{dx} r(x) \right| w_\beta(x)$$

In the equation (1), x represents a pixel value of the input image signal. E(x) represents an evaluation value of the gamma conversion function L(x) in case that the pixel value is x. R(x) represents a lightness of the pixel value x at the first gamma characteristic of the display device connected. r(x) represents a lightness of the pixel value x at the second gamma characteristic of the display device connected. λ is the weight coefficient. $w_\alpha(x)$ and $w_\beta(x)$ represent weights of gradation x in the histogram H. A first term in the equation (1) represents a squared error between a lightness of the first gamma characteristic and a lightness of the second gamma characteristic. A second term in the equation (1) represents a squared error between a gradation of lightness of the first gamma characteristic and a gradation of lightness of the second gamma characteristic. In the first embodiment, based on the weight coefficient λ and the histogram H, a conversion function to minimize E(x) for the pixel value x is calculated as the gamma conversion function L(x).

A method for calculating the gamma conversion function L(x) will be explained. Assume that $x_{max}$=256. First, as to 128 gradation as an internally dividing point between 0 gradation and 256 gradation, an output gradation $L(x_{0,1})$ thereof is calculated. Next, as to 64 gradation as an internally dividing point between 0 gradation and 128 gradation, an output gradation $L(x_{1,1})$ thereof is calculated. Furthermore, as to 192 gradation as an internally dividing point between 129 gradation and 256 gradation, an output gradation $L(x_{1,3})$ thereof is calculated. Hereafter, until all output gradations (all pixel values) are determined, above processing is repeated. Here, a hierarchical number of repeat processing is l, a number of position of input/output gradation is p, and an input gradation of each hierarchy is $x_{l,p}$.

Now, as to an internally dividing point $x_{l,p}$ between input gradations $x_{i,p-1}$ and $x_{i,p+1}$, calculation of an output gradation $L(x_{l,p})$ is thought about. Here, by representing the histogram H as two partial histograms having frequencies of gradations $x_{i,p-1} \sim x_{i,p}$ and frequencies of gradations $x_{i,p} \sim x_{i,p+1}$, two weights $w_\alpha(x)$ and $w_\beta(x)$ for gradations $x_{i,p-1} \sim x_{i,p+1}$ are calculated by following equation.

$$w_\alpha(x_{l,p}, x_{l,p+1}) = \frac{\sum_{i=x_{l,p-1}}^{x_{l,p}-1} H(i)}{\left(\sum_{i=x_{l,p-1}}^{x_{l,p}-1} H(i)\right) + \left(\sum_{i=x_{l,p}}^{x_{l,p+1}-1} H(i)\right)},$$

$$w_\beta(x_{l,p}, x_{l,p+1}) = \frac{\sum_{i=x_{l,p}}^{x_{l,p+1}-1} H(i)}{\left(\sum_{i=x_{l,p-1}}^{x_{l,p}-1} H(i)\right) + \left(\sum_{i=x_{l,p}}^{x_{l,p+1}-1} H(i)\right)}$$
(2)

In the equation (2), H(i) represents appearance frequency of the pixel value i.

Figure 4:
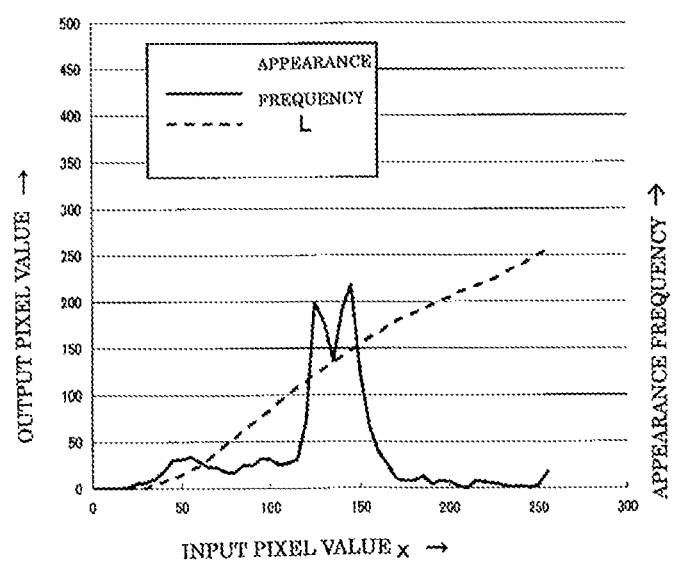
FIG. 4 is a schematic diagram to show one example of a gamma conversion function according to the first embodiment.

FIG. 4 shows one example of the gamma conversion function L(x) calculated by equations (1) and (2) in case that the weight coefficient λ emphasizes a gradation of lightness (λ=0.0). In graph of FIG. 4, a horizontal axis represents pixel values, a solid line along a vertical axis represents an appearance frequency, and a broken line along the vertical axis represents output characteristic of the gamma conversion function L(x). As shown in the gamma conversion function L(x) of FIG. 4, a gradation of lightness is larger at gradations having high appearance frequency. This reason is, in case that the weight coefficient λ emphasizes a gradation of lightness (λ=0.0), the gamma conversion function L(x) is calculated so as to minimize an error of gradation of lightness of the second term in the equation (1). Furthermore, in case that the weight coefficient λ emphasizes a lightness (λ=1.0), as to the gamma conversion function L(x) not shown in FIG. 4, a luminance is higher at gradations having high appearance frequency. This reason is, in case that the weight coefficient λ emphasizes a lightness (λ=1.0), the gamma conversion function L(x) is calculated so as to minimize an error of lightness of the first term in the equation (1).

As mentioned-above, at S104~S105, by using the weight coefficient λ and pixel values of the input image signal, the gamma conversion function to approximate the second gamma characteristic of the display device to a lightness and a gradation of the lightness of the first gamma characteristic is calculated. Here, by S101~S103, the weight coefficient λ is outputted based on lightness information of the input image signal. Accordingly, at S104~S105, the gamma conversion function to suitably improve quality (contrast and tone) based on lightness information of the input image signal is outputted.

The conversion unit 12 converts pixel values of the input image signal by using the gamma conversion function L(x), and obtains an output image signal. In the first embodiment, as to a horizontal pixel position u and a vertical pixel position v in the input image signal, and a pixel value x(u, v) as a luminance component corresponding thereto, a video signal f(u,v) is calculated by converting a gradation of the pixel value x(u,v) with following equation.

$$f(u,v)=L(x(u,v))$$
(3)

Next, it is decided whether a previous pixel in the image is already converted (S107). If the previous pixel is not converted yet (No at S107), processing is forwarded to S108. The pixel (not converted yet) is selected, and processing is returned to S106 (S108). If the pixel is already converted (Yes at S107), processing is forwarded to S109. Last, the output image signal is outputted (S109).

As mentioned-above, according to the image processing apparatus 100 of the first embodiment, the gamma conversion function L(x) to approximate the second gamma characteristic of the display device to a lightness and a gradation of the lightness of the first gamma characteristic is calculated by using the weight coefficient λ and the histogram H. As a result, if light information of the image is dark and the weight coefficient λ is set to emphasize the lightness, contrast of the image is improved. On the other hand, if light information of the image is bright and the weight coefficient λ is set to emphasize the gradation of lightness, tone of the image is improved.

The first gamma characteristic represents a display characteristic in case that the display device (connected) is not influenced by an external light. The second gamma characteristic represents a display characteristic in case that the display device includes fall of peak luminance and bright black phenomenon of dark area in actual viewing environment. By using the first gamma characteristic and the second gamma characteristic, at both a bright area having insufficient peak luminance and a dark area having bright black phenomenon in the image, suitable local area gamma characteristic can be respectively calculated. As a result, even if the second gamma characteristic of the display device is narrower than the first gamma characteristic, effect that contrast and tone are suitably heightened based on lightness information of the image can be acquired.

(The Second Embodiment)

Figure 5:
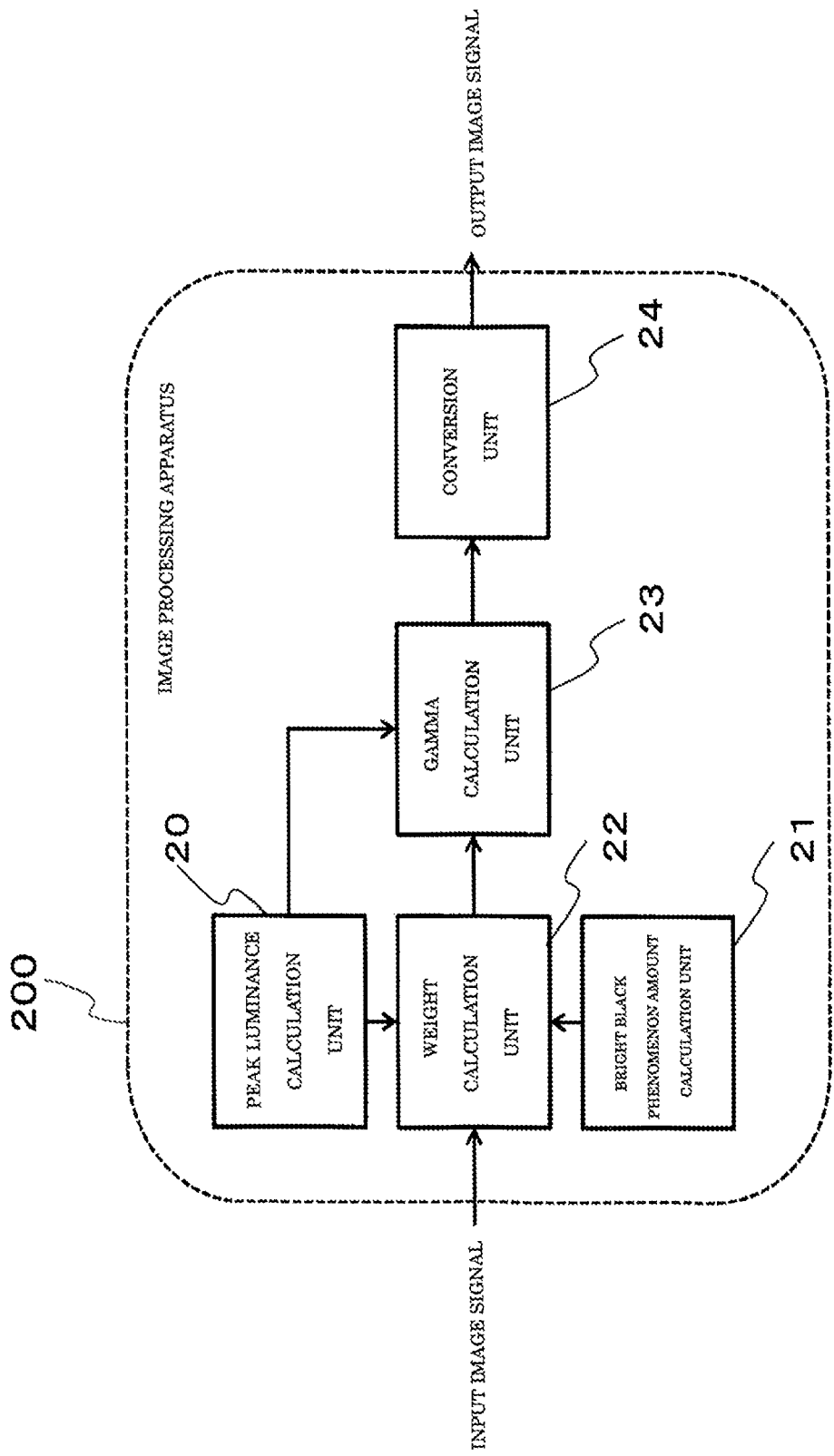
FIG. 5 is a block diagram of an image processing apparatus 200 according to the second embodiment.

FIG. 5 is a block diagram of an image processing apparatus 200 of the second embodiment. The image processing apparatus 200 includes a peak luminance calculation unit 20, a bright black phenomenon amount calculation unit 21, a weight calculation unit 22, a gamma calculation unit 23, and a conversion unit 24.

The peak luminance calculation unit 20 calculates a first peak luminance as ideal peak luminance of the display device connected, and a second peak luminance as a peak luminance actually settable. The peak luminance calculation unit 20 sends the first peak luminance and the second peak luminance to the weight calculation unit 22 and the gamma calculation unit 23.

The bright black phenomenon amount calculation unit 21 calculates a bright black phenomenon amount of a screen of the display device, and sends the bright black phenomenon amount to the weight calculation unit 22.

The weight calculation unit 22 calculates lightness information of the image. By using the lightness information, the first peak luminance, the second peak luminance, and the bright black phenomenon amount, the weight calculation unit 22 calculates a weight coefficient λ representing that the second gamma characteristic of the display device is approximated to which of a lightness and a gradation of the lightness of the first gamma characteristic, and sends the weight coefficient λ to the gamma calculation unit 23.

By using the weight coefficient λ, the first peak luminance, the second peak luminance, and pixel values of the input image signal, the gamma calculation unit 23 calculates a gamma conversion function to approximate the second gamma coefficient of the display device to a lightness and a gradation of the lightness of the first gamma characteristic, and sends the gamma conversion function to the conversion unit 24. The conversion unit 24 converts pixel values of the input image signal by using the gamma conversion function, and outputs the image signal.

Figure 6:
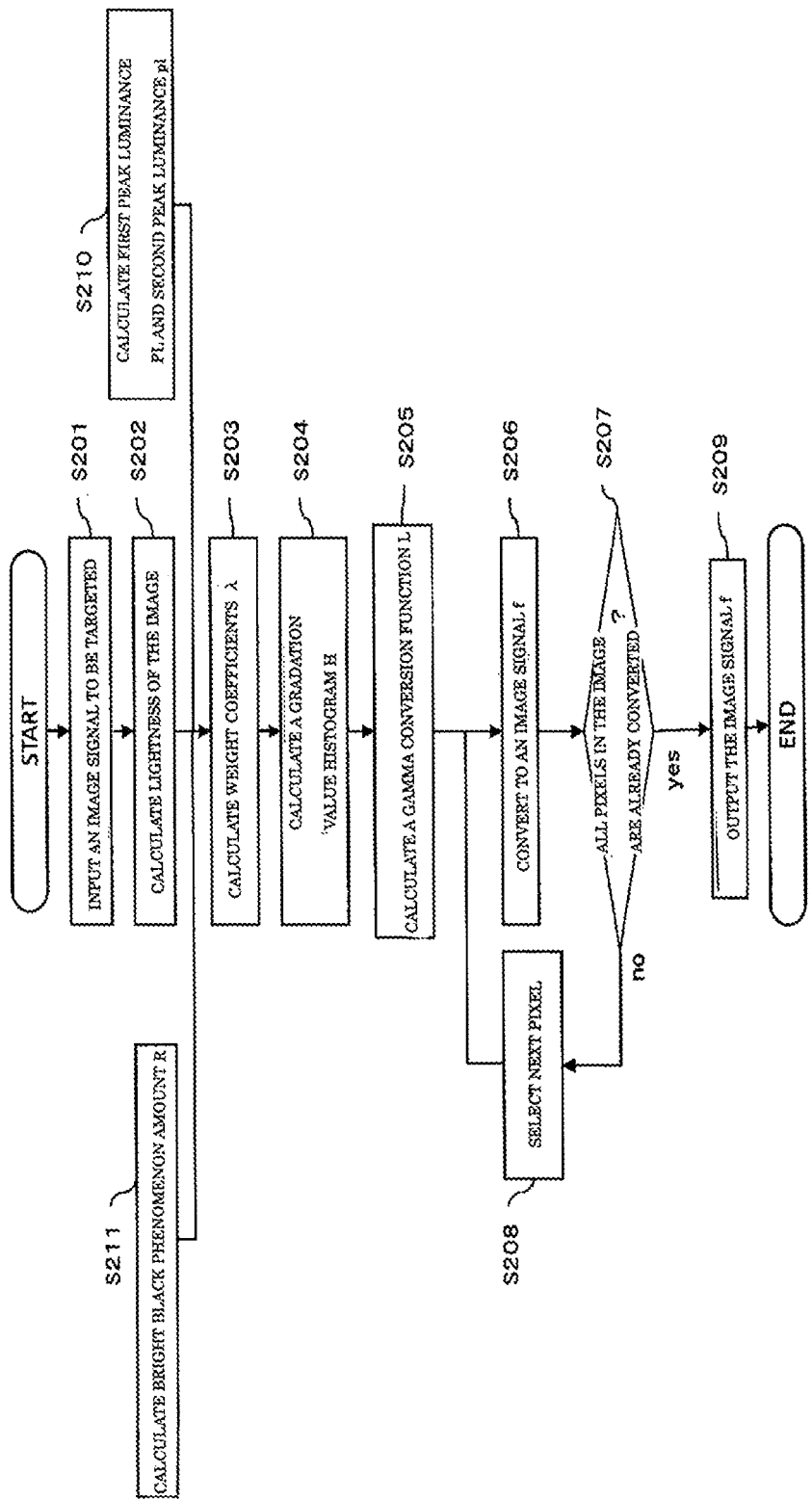
FIG. 6 is a flow chart of operation of the image processing apparatus 200.

Next, operation of each unit 20-24 will be explained. FIG. 6 is a flow chart of operation of the image display apparatus 200. Steps of S201~S202 and S206~S209 are same as steps of S101~S102 and S106~S109. Accordingly, explanation thereof is omitted.

The peak luminance calculation unit 20 calculates a first peak luminance PL as ideal peak luminance of the display device, and a second peak luminance pl as a peak luminance actually settable (S210). The peak luminance calculation unit 20 sends the first peak luminance PL and the second peak luminance pl to the weight calculation unit 22.

PL is ideal peak luminance of the display device connected to the image processing apparatus 200. If the display device is direct viewing type such as LCD, PL had better be a maximum luminance displayable on the display when a light source such as LED is set to a maximum lightness settable. Furthermore, if the display device is projection type such as a projector, PL had better be a maximum luminance displayable on the projector when a light source such as lamp is set to a maximum lightness settable.

pl is a peak luminance actually settable to the display device. As to a general display device, from viewpoint of heat generation or power saving, a peak luminance lower than the first peak luminance is often set to the display device while actually being displayed. Accordingly, the peak luminance actually set to the display device had better be set as pl. pl may be set by an external device connected to the image processing apparatus 200 and by a user. Furthermore, for example, pl may be set by input values detected from a photo sensor.

As mentioned-above, at S210, the peak luminance of the display device actually connected is suitably set. Accordingly, accuracy of a gamma conversion function (calculated by the gamma calculation unit 23) based on the first gamma characteristic and the second gamma characteristic is improved. As a result, contrast and tone of an output image realized by the gamma conversion function is improved.

The bright black phenomenon amount calculation unit 21 calculates a bright black phenomenon amount RF of a screen of the display device (S211), and sends the bright black phenomenon RF to the weight calculation unit 22. The bright black phenomenon amount represents a difference between black actually viewed and ideal black when black is displayed on the screen. In this case, the bright black phenomenon amount RF is imagined to be previously set based on the display device. For example, if the display device is direct viewing type such as LCD, the bright black phenomenon amount had better be set based on contrast of liquid crystal panel. Here, lightness of backlight thereof should be taken into consideration.

Furthermore, the bright black phenomenon amount RF may be set by using information of a viewing environment of the display device. In general, if the display device is direct viewing type such as LCD, while an external light incident on a display screen is brightened, the bright black phenomenon is increased. Furthermore, if the display device is projection type such as a projector, while the external light incident onto a projection screen is brightened, the bright black phenomenon is increased. In these situations, by acquiring intensity of external light incident onto the display screen or the projection screen using a photo sensor or a camera, the bright black phenomenon amount RF had better be increased/decreased based on the intensity.

As mentioned-above, by processing of S211, the bright black phenomenon amount can be set based on device characteristic of the display device or lightness of external light in the viewing environment.

The weight calculation unit 22 calculates lightness information of the image (S202). By using the lightness information, the first peak luminance, the second peak luminance, and the bright black phenomenon amount, the weight calculation unit 22 calculates a weight coefficient λ representing that the second gamma characteristic of the display device is approximated to which of a lightness and a gradation of the lightness of the first gamma characteristic, and sends the weight coefficient λ to the gamma calculation unit 23 (S203).

In this case, if a difference between the first peak luminance PL and the second peak luminance pl is large and if the lightness information is brighter, the weight coefficient λ is set so as to more emphasize the gradation of lightness. This reason is, if a difference between the first peak luminance PL and the second peak luminance pl is large, in order to raise tone of the bright image, the second gamma characteristic of the display device needs to be approximated to the gradation of lightness of the first gamma characteristic.

Furthermore, if the bright black phenomenon amount is large and if the lightness information is darker, the weight coefficient λ is set so as to more emphasize the lightness. This reason is, if the bright black phenomenon information amount is large, in order to suppress bright black phenomenon of dark image, the second gamma characteristic of the display device needs to be approximated to the lightness of the first gamma characteristic.

The gamma calculation unit 23 calculates a pixel value histogram H from pixel values of pixels included in the image (S204). At S204 in the second embodiment, the histogram H had better be prepared with bins of $x_{max}$ units as maximum pixel values of each pixel.

By using the first peak luminance PL, the second peak luminance pl, the weight coefficient λ and the histogram H, a gamma conversion function L(x) to approximate the second gamma characteristic of the display device to a lightness and a gradation of the lightness of the first gamma characteristic is calculated, and sent to the conversion unit 24 (S205).

The gamma conversion function L(x) is calculated by following equation.

$$L(x) = \operatorname{argmin}(E(x, pl)) \quad (4)$$

$$E(x) = \lambda \sum_{x=0}^{x_{max}} |R(x, PL) - r(x, pl)| w_\alpha(x) +$$

$$(1-\lambda) \sum_{x=0}^{x_{max}} \left| \frac{d}{dx} R(x, PL) - \frac{d}{dx} r(x, pl) \right| w_\beta(x)$$

In the equation (4), x represents a pixel value of the input image signal. PL represents the first peak luminance as mentioned-above. pl represents the second peak luminance actually set to the display device connected. E(x) represents an evaluation value of the gamma conversion function L(x) in case that the pixel value is x, ideal peak luminance is PL, and the second peak luminance is pl. R(x,PL) represents a lightness of the pixel value x at the first gamma characteristic of the display device connected. r(x,pl) represents a lightness of the pixel value x at the second gamma characteristic of the display device connected. $\lambda$ is the weight coefficient. $w_\alpha(x)$ and $w_\beta(x)$ represent weights of gradation x in the histogram H shown in the first embodiment. A first term in the equation (4) represents a squared error between a lightness of the first gamma characteristic and a lightness of the second gamma characteristic. A second term in the equation (4) represents a squared error between a gradation of lightness of the first gamma characteristic and a gradation of lightness of the second gamma characteristic. In the second embodiment, a function L(x) to minimize E(x) is outputted as the gamma conversion function (S205). A concrete method for calculating the gamma conversion function L(x) is same as that of the first embodiment. Accordingly, explanation thereof is omitted.

As mentioned-above, by steps S202~S205 and S210~S211 of the second embodiment, the gamma conversion function L(x) to approximate the second gamma characteristic of the display device to the lightness and the gradation thereof of the first gamma characteristic is outputted by using the first peak luminance and the second peak luminance. Accordingly, even if the display device (to be connected) or the viewing environment is variously changed, the image of which contrast and tone are suitably heightened can be generated.

(The Third Embodiment)

Figure 7:
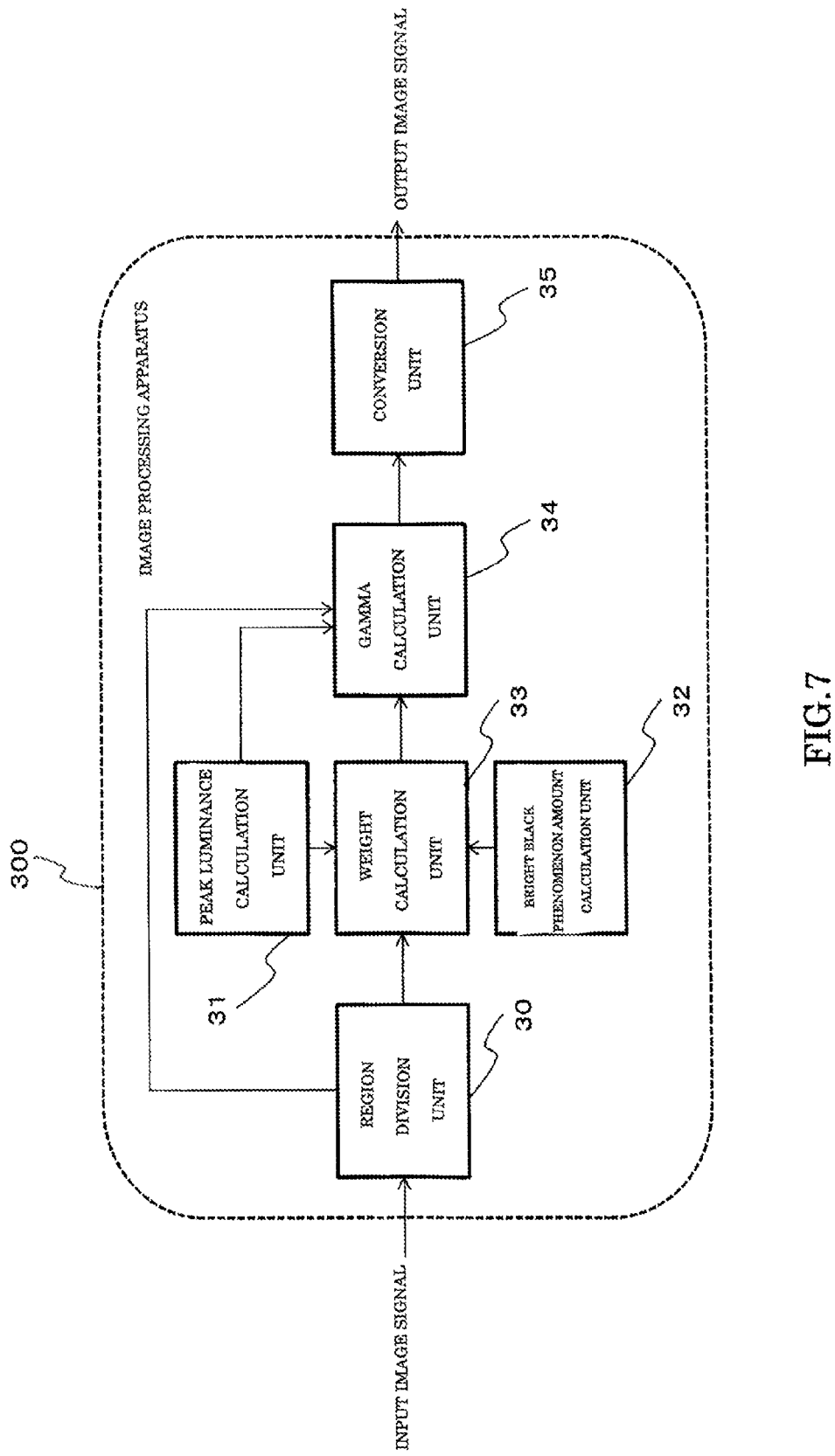
FIG. 7 is a block diagram of an image processing apparatus 300 according to the third embodiment.

FIG. 7 is a block diagram of an image processing apparatus 300 of the third embodiment. The image processing apparatus 300 includes a region division unit 30, a peak luminance calculation unit 31, a bright black phenomenon amount calculation unit 32, a weight calculation unit 33, a gamma calculation unit 34, and a conversion unit 35. The peak luminance calculation unit 31 and the bright black phenomenon amount calculation unit 32 are same as the peak luminance calculation unit 20 and the bright black phenomenon amount calculation unit 21 of the image processing apparatus 200 of the second embodiment. Accordingly, explanation thereof is omitted.

The region division unit 30 divides the input image into a plurality of (at least two) regions each including at least one pixel, and outputs the regions to the weight calculation unit 33 and the gamma calculation unit 34.

By using pixel values of pixels in the input image signal of each region (outputted from the region division unit 30) and the weight coefficient $\lambda$ thereof (outputted from the weight calculation unit 33), the gamma calculation unit 34 calculates a plurality of gamma conversion functions to approximate the second gamma characteristic of the display device to a lightness and a gradation of the lightness of the first gamma characteristic, and outputs the gamma conversion functions to the conversion unit 35.

By using the gamma conversion functions outputted from the gamma calculation unit 34, the conversion unit 35 converts pixel values of the input image signal, and outputs the image signal.

Figure 8:
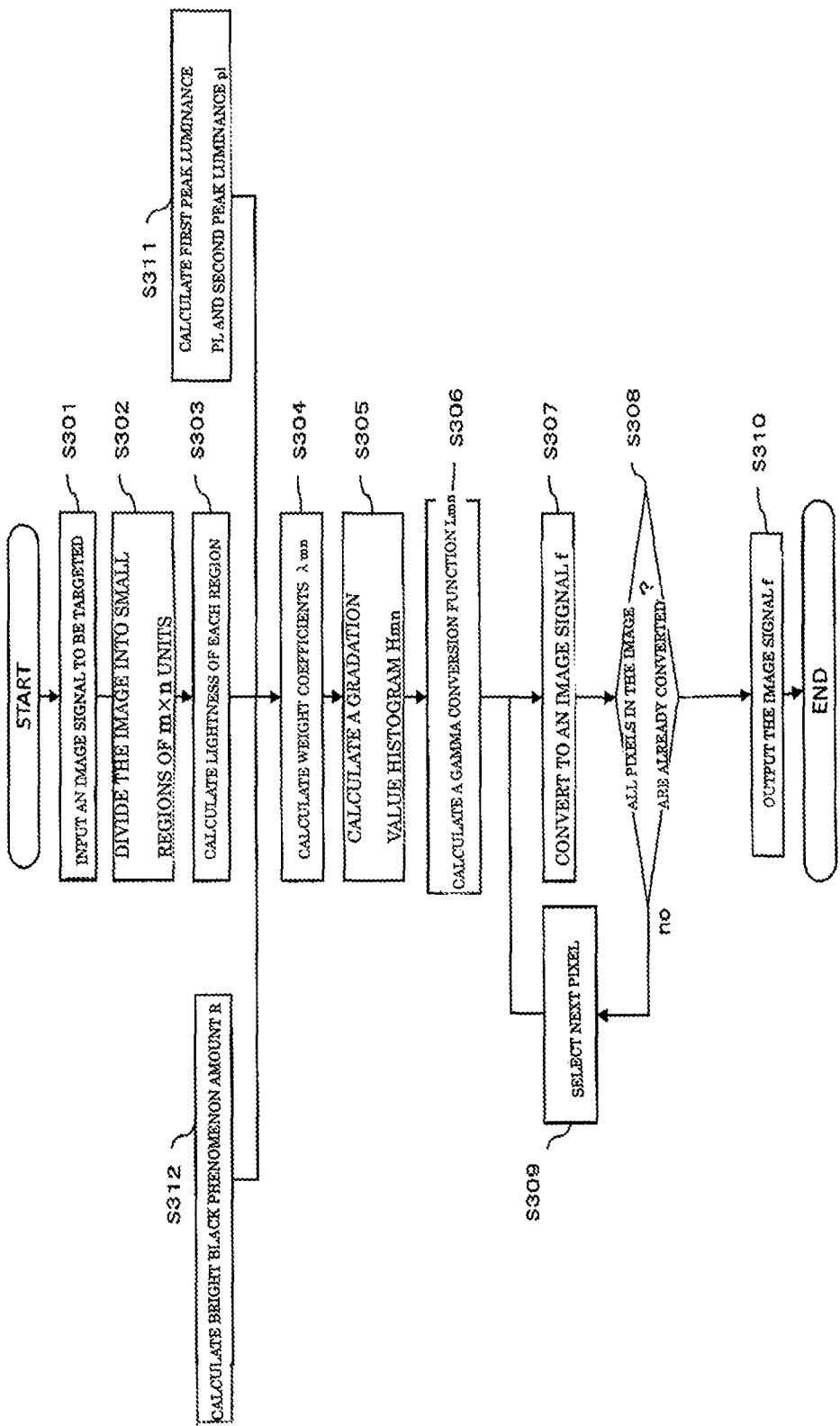
FIG. 8 is a flow chart of operation of the image processing apparatus 300.

Next, operation of each unit will be explained. FIG. 8 is a flow chart of operation of the image display apparatus 300. In FIG. 8, steps of S307~S312 are same as steps of S206~S211 of the image processing apparatus 200 of the second embodiment. Accordingly, explanation thereof is omitted.

The region division unit 30 accepts the input image (S301), divides the input image into a plurality of (at least two) regions each including at least one pixel, and outputs the regions to the weight calculation unit 33 and the gamma calculation unit 34 (S302).

In the third embodiment, the input image signal is divided into regions of m×n units. A shape of region can be variously imaged. In following explanation, the shape of region is imagined by dividing into m units along a horizontal direction and by dividing into n units along a vertical direction. Moreover, this region may be non-linear shape by clustering each area of human or each object.

The weight calculation unit 33 calculates light information of each of m×n regions (outputted from the region division unit 30) (S303). By using the lightness information of each region, the weight calculation unit 33 calculates weights coefficients $\lambda_{mn}$ representing that the second gamma characteristic of each region of the display device is approximated to which of a lightness and a gradation of the lightness of the first gamma characteristic, and outputs the weight coefficients to the gamma calculation unit 34 (S304).

At S303, the lightness information represents at least one information correlative to a lightness obtained from each region of the input image signal. By using pixel values of pixels in a part (over one pixel) of each region, the lightness information had better be calculated by statistical operation, such as an average, a maximum, a minimum, a median, or a percentile. Furthermore, the lightness information may be calculated from not only one image but also a plurality of images temporarily continued such as sequential dynamic image. Furthermore, different lightness information may be calculated from regions separated in space.

As mentioned-above, at S301~S304, the weight coefficient $\lambda_{mn}$ is outputted based on lightness information of each region of the input image signal. Accordingly, in comparison with the image processing apparatus 100 of the first embodiment, local contrast and tone of each region can be more finely controlled.

The gamma calculation unit 34 calculates a pixel value histogram $H_{mn}$ from pixel values of pixels included in m×n regions of the image (outputted from the region division unit 30) (S305). At S305 in the third embodiment, the histogram $H_{mn}$ had better be prepared with bins of $x_{max}$ units as maximum pixel values of each pixel.

By using the weight coefficient $\lambda_{mn}$ and the histogram $H_{mn}$ a gamma conversion function $L_{mn}(x)$ to approximate the second gamma characteristic of the display device to a lightness and a gradation of the lightness of the first gamma characteristic is calculated, and sent to the conversion unit 35 (S306). The gamma conversion function $L_{mn}(x)$ is calculated by following equation.

$$L_{mn}(x) = \arg\min(E_{mn}(x)) \quad (5)$$

$$E_{mn}(x) = \lambda_{mn} \sum_{x=0}^{x_{max}} |R(x, PL) - r(x, pl)| w_{mn\alpha}(x) +$$

$$(1 - \lambda_{mn}) \sum_{x=0}^{x_{max}} \left| \frac{d}{dx} R(x, PL) - \frac{d}{dx} r(x, pl) \right| w_{mn\beta}(x)$$

In the equation (5), x represents a pixel value of the input image signal. $E_{mn}(x)$ represents an evaluation value of the gamma conversion function $L_{mn}(x)$ in case that the pixel value is x. R(x) represents a lightness of the pixel value x at the first gamma characteristic of the display device connected. r(x) represents a lightness of the pixel value x at the second gamma characteristic of the display device connected.

λ is the weight coefficient. $w_{mn_\alpha}(x)$ and $w_{mn_\beta}(x)$ represent weights of gradation x in the histogram H. A first term in the equation (4) represents a squared error between a lightness of the first gamma characteristic and a lightness of the second gamma characteristic. A second term in the equation (4) represents a squared error between a gradation of lightness of the first gamma characteristic and a gradation of lightness of the second gamma characteristic. In the third embodiment, based on the weight coefficient $\lambda_{mn}$ and the histogram $H_{mn}$ a conversion function to minimize E(x) for each gradation x is calculated as the gamma conversion function $L_{mn}(x)$.

A method for calculating the gamma conversion function $L_{mn}(x)$ will be explained. Assume that $x_{max}=256$. First, as to 128 gradation as an internally dividing point between 0 gradation and 256 gradation, an output gradation $L_{mn}(x_{0,1})$ thereof is calculated. Next, as to 64 gradation as an internally dividing point between 0 gradation and 128 gradation, an output gradation $L_{mn}(x_{1,1})$ thereof is calculated. Furthermore, as to 192 gradation as an internally dividing point between 129 gradation and 256 gradation, an output gradation $L_{mn}(x_{1,3})$ thereof is calculated. Hereafter, until all output gradations (all pixel values) are determined, above processing is repeated. Here, a hierarchical number of repeat processing is l, a number of position of input/output gradation is p, and an input gradation of each hierarchy is $x_{l,p}$.

Now, as to an internally dividing point $x_{l,p}$ between input gradations $x_{i,p-1}$ and $x_{i,p+1}$, calculation of an output gradation $L_{mn}(x_{l,p})$ is thought about. Here, by representing the histogram $H_{mn}$ as two partial histograms having frequencies of gradations $x_{i,p-1} \sim x_{i,p}$ and frequencies of gradations $x_{i,p} \sim x_{i,p+1}$, two weights $w_{mn_\alpha}(x)$ and $w_{mn_\beta}(x)$ for gradations $x_{i,p-1} \sim x_{i,p+1}$ are calculated by following equation.

$$w_{mn\alpha}(x_{l,p}, x_{l,p+1}) = \frac{\sum_{i=x_{l,p-1}}^{x_{l,p}-1} H_{mn}(i)}{\left(\sum_{i=x_{l,p-1}}^{x_{l,p}-1} H_{mn}(i)\right) + \left(\sum_{i=x_{l,p}}^{x_{l,p+1}-1} H_{mn}(i)\right)},$$

$$w_{mn\beta}(x_{l,p}, x_{l,p+1}) = \frac{\sum_{i=x_{l,p}}^{x_{l,p+1}-1} H_{mn}(i)}{\left(\sum_{i=x_{l,p-1}}^{x_{l,p}-1} H_{mn}(i)\right) + \left(\sum_{i=x_{l,p}}^{x_{l,p+1}-1} H_{mn}(i)\right)}$$

(6)

In the equation (2), $H_{mn}(i)$ represents appearance frequency of the pixel value i As mentioned-above, at S305~S306, by using the weight coefficient $\lambda_{mn}$ and pixel values of the input image signal, the gamma conversion function to approximate the second gamma characteristic of each region of the display device to a lightness and a gradation of the lightness of the first gamma characteristic is calculated. Here, by S301~S304, the weight coefficient $\lambda_{mn}$ is outputted based on lightness information of each region of the input image signal. Accordingly, at S305~S306, the gamma conversion function to suitably improve quality (contrast and tone) based on lightness information of each region of the input image signal is outputted.

The conversion unit 35 converts a pixel value of each pixel of the input image signal by using the gamma conversion function L(x) of each region including the pixel, and outputs an image signal f. In the third embodiment, as to a horizontal pixel position u and a vertical pixel position v in the input image signal, and a pixel value x(u,v) as a luminance component corresponding thereto, a video signal f (u,v) is calculated by converting a gradation of the pixel value x(u,v) with following equation.

$$f(u,v) = L_{mn}(x(u,v)) \qquad (7)$$

Next, it is decided whether a previous pixel in the image is already converted (S308). If the previous pixel is not converted yet (No at S308), processing is forwarded to S309. The pixel (not converted yet) is selected, and processing is returned to S307 (S309). If the pixel is already converted (Yes at S307), processing is forwarded to S310. Last, the output image signal is outputted (S310).

As mentioned-above, according to the image processing apparatus 300 of the third embodiment, the gamma conversion function $L_{mn}(x)$ to approximate the second gamma characteristic of each region of the display device to a lightness and a gradation of the lightness of the first gamma characteristic is calculated by using the weight coefficient $\lambda_{mn}$ of each region and the histogram of each region. As a result, if light information of a local region of of the image is dark and the weight coefficient $\lambda_{mn}$ is set to emphasize the lightness, contrast of the local region of the image is improved. On the other hand, if light information of a local region of the image is bright and the weight coefficient $\lambda_{mn}$ is set to emphasize the gradation of lightness, tone of the local region of the image is improved. As a result, even if the second gamma characteristic of the display device is narrower than the first gamma characteristic, effect that contrast and tone are suitably heightened based on lightness information of each region of the image can be acquired.

(The Fourth Embodiment)

Figure 9:
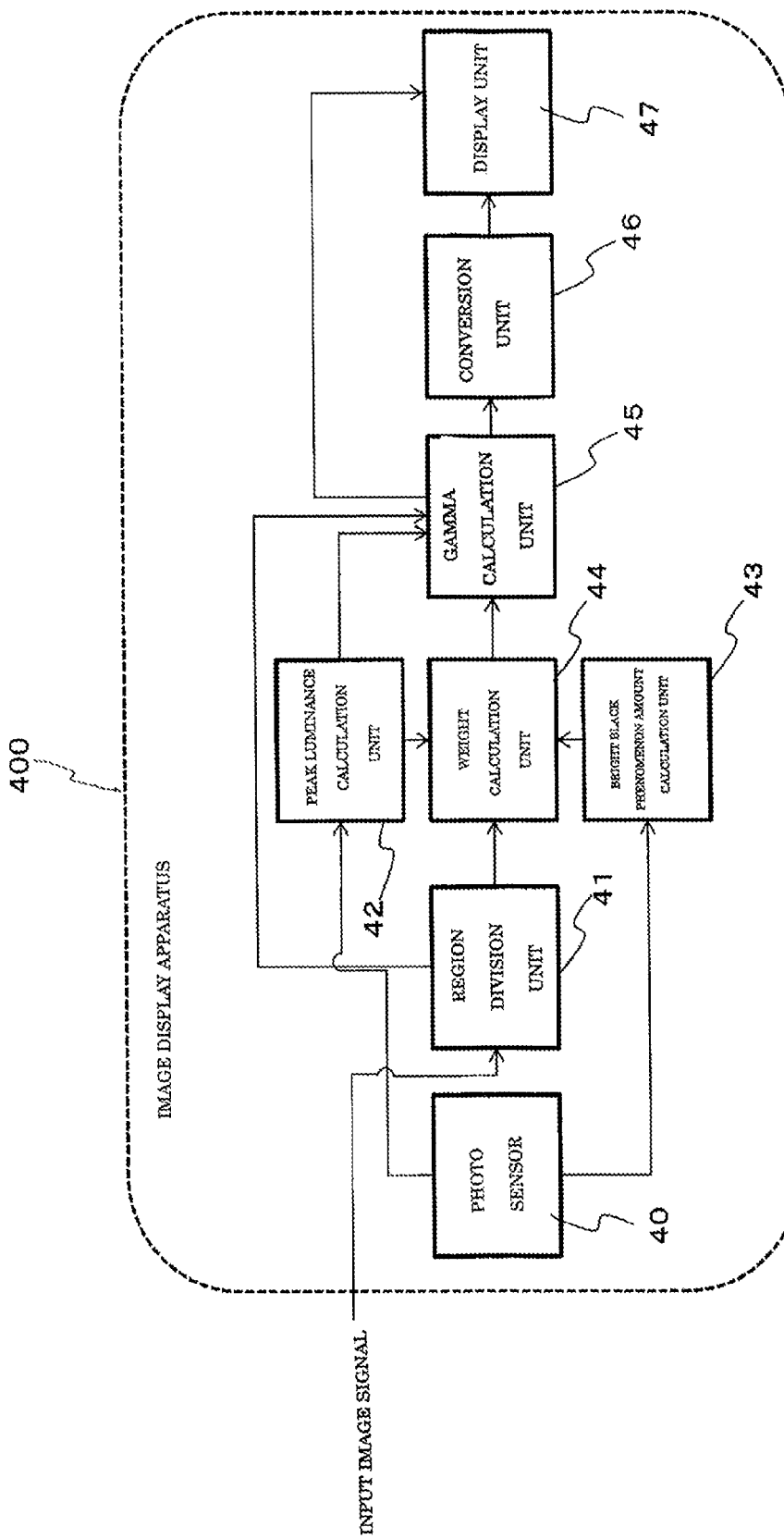
FIG. 9 is a block diagram of an image display apparatus 400 according to the fourth embodiment.

FIG. 9 is a block diagram of an image display apparatus 400 of the fourth embodiment. The image display apparatus 400 includes a photo sensor 40, a region division unit 41, a peak luminance calculation unit 42, a bright black phenomenon amount calculation unit 43, a weight calculation unit 44, a gamma calculation unit 45, a conversion unit 46, and a display unit 47. The region division unit 41 and the weight calculation unit 44 are same as the region division unit 30 and the weight calculation unit 33 of the image processing apparatus 300 of the third embodiment. Accordingly, explanation thereof is omitted.

The photo sensor calculates a lightness of an external light incident onto the image display apparatus 400, and outputs the lightness to the peak luminance calculation unit 42 and the bright black phenomenon amount calculation unit 43.

The peak luminance calculation unit 42 calculates a first peak luminance as ideal peak luminance of the image display apparatus 400, and a second peak luminance as a peak luminance actually settable. The peak luminance calculation unit 42 sends the first peak luminance and the second peak luminance to the weight calculation unit 44 and the gamma calculation unit 45. In general, in order to maintain feeling of lightness of the display image, if a lightness of the external light is brighter, the second peak luminance needs to be higher. Accordingly, when the lightness of the external light is brighter, the peak luminance calculation unit 42 operates so as to heighten the second peak luminance.

The bright black phenomenon amount calculation unit 43 calculates a bright black phenomenon amount of a screen of the image display apparatus 400, and sends the bright black phenomenon amount to the weight calculation unit 44. In general, the brighter the lightness of the external light is, the larger the bright black phenomenon amount is, because reflection of the external light at the screen increases. Accordingly, in the fourth embodiment, when the lightness of the external light is brighter, the bright black phenomenon amount calculation unit 43 operates so as to calculate the bright black phenomenon amount highly.

By using pixel values of pixels of each region (outputted from the region division unit 41), the weight coefficients $\lambda_{mn}$ (outputted from the weight calculation unit 44), the first peak luminance and the second peak luminance (outputted from the peak luminance calculation unit 42), the gamma calculation unit 45 calculates the gamma conversion function $L_{mn}(x)$ to approximate the second gamma coefficient of each region of the display unit 47 to a lightness and a gradation of the lightness of the first gamma characteristic, and outputs the gamma conversion function to the conversion unit 46.

The conversion unit 46 converts pixel values of each region of the input image signal by using the gamma conversion function corresponding to the region, and outputs an image signal having converted pixel values to the display unit 47. The display unit 47 displays the image signal.

As mentioned-above, according to the fourth embodiment, the peak luminance and the bright black phenomenon amount are dynamically calculated based on lightness of the external light incident onto the image display apparatus 400, and the weight coefficient is calculated based on the situation. Accordingly, even if a viewing environment of the image display apparatus 400 is variously changed, the image of which contrast and tone are suitable heightened can be displayed.

(The Fifth Embodiment)

Figure 10:
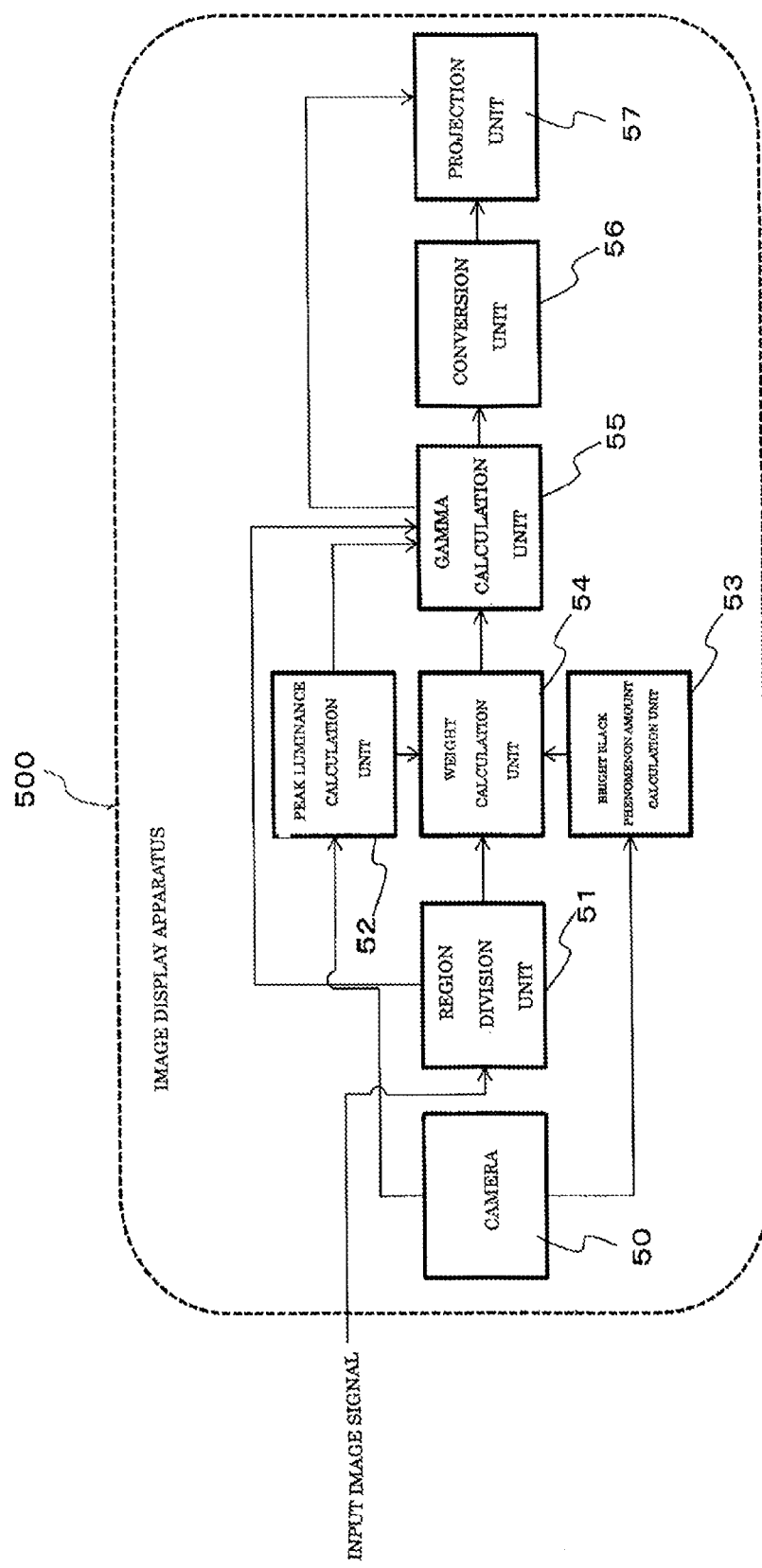
FIG. 10 is a block diagram of an image display apparatus 500 according to the fifth embodiment.

FIG. 10 is a block diagram of an image display (projection) apparatus 500 of the fifth embodiment. The image display apparatus 500 includes a camera 50, a region division unit 51, a peak luminance calculation unit 52, a bright black phenomenon amount calculation unit 53, a weight calculation unit 54, a gamma calculation unit 55, a conversion unit 56, and a projection unit 57. The region division unit 51, the peak luminance calculation unit 52, the bright black phenomenon amount calculation unit 53, the weight calculation unit 54, the gamma calculation unit 55, the conversion unit 56, and the projection unit 57, are same as the region division unit 41, the peak luminance calculation unit 42, the bright black phenomenon amount calculation unit 43, the weight calculation unit 44, the gamma calculation unit 45, the conversion unit 46, and the display unit 47 of the fourth embodiment. Accordingly, explanation thereof is omitted.

The camera 50 photographs a scene of a projection plane projected by the projection apparatus, calculates a lightness of the external light incident onto the projection plane from the photographed scene, and outputs the lightness to the peak luminance calculation unit 52 and the bright black phenomenon amount calculation unit 53. The lightness E of the external light is calculated by following equation.

$$E = C(x_{max}) - C(x_{min}) \quad (8)$$

In the equation (8), $x_{max}$ is maximum pixel value able to be represented by the projection apparatus 500, $x_{min}$ is minimum pixel value able to be represented by the projection apparatus 500, and C( ) is an output image from the camera 50 when the camera 50 photographs a projection image (having gradation x) projected by the projection apparatus 500. Briefly, a difference of photographed image between an entire white projection image and an entire black projection image is calculated as the lightness of the external light incident onto the projection plane.

The peak luminance calculation unit 52 calculates a first peak luminance as ideal peak luminance of the image display apparatus 500, and a second peak luminance as a peak luminance actually settable. The peak luminance calculation unit 52 sends the first peak luminance and the second peak luminance to the weight calculation unit 54 and the gamma calculation unit 55. In general, in order to maintain feeling of lightness of the projection image, if a lightness of the external light is brighter, the second peak luminance needs to be higher. Accordingly, when the lightness of the external light is brighter, the peak luminance calculation unit 52 operates so as to heighten the second peak luminance.

The bright black phenomenon amount calculation unit 53 calculates a bright black phenomenon amount of a projection plane of the image display apparatus 500, and sends the bright black phenomenon amount to the weight calculation unit 54. In general, the brighter the lightness of the external light is, the larger the bright black phenomenon amount is, because reflection of the external light at the projection plane increases. Accordingly, in the fifth embodiment, when the lightness of the external light is brighter, the bright black phenomenon amount calculation unit 53 operates so as to calculate the bright black phenomenon amount highly.

By using pixel values of pixels of each region (outputted from the region division unit 51), the weight coefficients $\lambda_{mn}$ (outputted from the weight calculation unit 54), the first peak luminance and the second peak luminance (outputted from the peak luminance calculation unit 52), the gamma calculation unit 55 calculates the gamma conversion function $L_{mn}(x)$ to approximate the second gamma coefficient of each region of the projection unit 57 to a lightness and a gradation of the lightness of the first gamma characteristic, and outputs the gamma conversion function to the conversion unit 56.

The conversion unit 56 converts pixel values of each region of the input image signal by using the gamma conversion function corresponding to the region, and outputs an image signal having converted pixel values to the projection unit 57. The projection unit 57 projects the image signal onto the projection plane.

As mentioned-above, according to the fifth embodiment, the peak luminance and the bright black phenomenon amount are dynamically calculated based on lightness of the external light incident onto the projection plane, and the weight coefficient is calculated based on the situation. Accordingly, even if a viewing environment of the projection plane is variously changed, the image of which contrast and tone are suitable heightened can be displayed.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for processing an image, comprising:
    a weight calculation unit configured to calculate a first weight coefficient and a second weight coefficient based on light information of the image,
        the first weight coefficient being included in a first item of a gamma conversion function,
        the second weight coefficient being included in a second item of the gamma conversion function,
        the first item representing a difference between lightness corresponding to a pixel value of the image of a first gamma characteristic and lightness corresponding to the pixel value of the image of a second gamma characteristic, the second item representing a difference between a gradation of the lightness corresponding to the pixel value of the image of the first gamma characteristic and a gradation of the lightness corresponding to the pixel value of the image of the second gamma characteristic, the first gamma characteristic representing a characteristic of a display connected to the apparatus in the dark, the second gamma characteristic having a narrower range of lightness than the first gamma characteristic and representing a characteristic of the display displaying the image in an environment;

a gamma calculation unit configured to calculate the gamma conversion function based on the first weight coefficient and the second weight coefficient; and a conversion unit configured to convert pixel values of the image, based on the gamma conversion function, wherein the darker the light information is, the larger the first weight coefficient is, and the brighter the light information is, the larger the second weight coefficient is.

2. The apparatus according to claim 1, wherein
the weight calculation unit calculates the first weight coefficient to more approximate the second gamma characteristic to the lightness of the first gamma characteristic if a bright black phenomenon amount of the display is larger.

3. The apparatus according to claim 1, wherein
the weight calculation unit calculates the second weight coefficient to more approximate the second gamma characteristic to the gradation of the lightness of the first gamma characteristic if a difference between a first peak luminance and a second peak luminance is larger, the first peak luminance is a maximum luminance of the display, and the second peak luminance is a peak luminance of the display actually operated.

4. The apparatus according to claim 1, further comprising:
a division unit configured to divide the image into a plurality of regions; wherein the weight calculation unit calculates the first weight coefficient and the second weight coefficient of each region, and the gamma calculation unit calculates the gamma conversion function of the each region.

5. The apparatus according to claim 1, further comprising:
a detection unit configured to detect a lightness of an external light; wherein the weight calculation unit calculates a bright black phenomenon amount based on the lightness of the external light, and calculates the first weight coefficient and the second weight coefficient to calculate the second gamma characteristic, the second gamma characteristic more approximates the lightness of the first gamma characteristic if the bright black phenomenon amount is larger, and more approximates the gradation of the lightness of the first gamma characteristic if a difference between a first peak luminance and a second peak luminance is larger, the first peak luminance is a maximum luminance of the display, and the second peak luminance is a peak luminance of the display actually operated, based on the lightness of the external light.

6. An apparatus for displaying an image, comprising:
a display unit to display the image on a screen;
a detection unit configured to detect lightness of an external light incident onto the screen;
a peak luminance calculation unit configured to calculate a peak luminance of the screen displaying the image, based on the lightness of the external light;
a weight calculation unit configured to calculate a first weight coefficient and a second weight coefficient based on the peak luminance,
the first weight coefficient being included in a first item of a gamma conversion function,
the second weight coefficient being included in a second item of the gamma conversion function,
the first item representing a difference between lightness corresponding to a pixel value of the image of a first gamma characteristic and lightness corresponding to the pixel value of the image of a second gamma characteristic,
the second item representing a difference between a gradation of the lightness corresponding to the pixel value of the image of the first gamma characteristic and a gradation of the lightness corresponding to the pixel value of the image of the second gamma characteristic,
the first gamma characteristic representing a characteristic of the display unit without influence of the external light,
the second gamma characteristic having a narrower range of lightness than the first gamma characteristic and representing a characteristic of the display unit displaying the image in an environment;
a gamma calculation unit configured to calculate the gamma conversion function based on the first weight coefficient and the second weight coefficient; and
a conversion unit configured to convert pixel values of the image, based on the gamma conversion function, wherein
the darker a light information of the image is, the larger the first weight coefficient is, and
the brighter the light information is, the larger the second weight coefficient is.

7. An apparatus for displaying an image, comprising:
a projection unit configured to project the image on a projection plane;
a detection unit configured to detect lightness of an external light incident onto the projection plane;
a peak luminance calculation unit configured to calculate a peak luminance of the projection plane projecting the image, based on the lightness of the external light;
a weight calculation unit configured to calculate a first weight coefficient and a second weight coefficient based on the peak luminance,
the first weight coefficient being included in a first item of a gamma conversion function,
the second weight coefficient being included in a second item of the gamma conversion function,
the first item representing a difference between lightness corresponding to a pixel value of the image of a first gamma characteristic and lightness corresponding to the pixel value of the image of a second gamma characteristic,
the second item representing a difference between a gradation of the lightness corresponding to the pixel value of the image of the first gamma characteristic and a gradation of the lightness corresponding to the pixel value of the image of the second gamma characteristic, the first gamma characteristic representing a characteristic of the projection unit without influence of the external light, the second gamma characteristic having a narrower range of lightness than the first gamma characteristic and representing a characteristic of the projection unit projecting the image in an environment;

a gamma calculation unit configured to calculate the gamma conversion function based on the first weight coefficient and the second weight coefficient; and a conversion unit configured to convert pixel values of the image, based on the gamma conversion function, wherein the darker a light information of the image is, the larger the first weight coefficient is, and the brighter the light information is the larger the second weight coefficient is.

8. The apparatus according to claim 7, wherein the detection unit is a camera.

\* \* \* \* \*